US004001786B2

United States Statutory Invention Registration [19]

[11] Reg. Number: H1786

Masse et al. [45] Published: Feb. 2, 1999

[54] PROCESS FOR RADIATION CURED CONJUGATED DIENE-VINYL AROMATIC HYDROCARBON BLOCK COPOLYMERS

[75] Inventors: Michael Alan Masse, Richmond; James Robert Erickson, Katy, both of Tex.

[73] Assignee: Shell Oil Company, Houston, Tex.

[21] Appl. No.: 90,854

[22] Filed: Jul. 12, 1993

[51] Int. Cl.[6] ..... C08F 2/46

[52] U.S. Cl. ..... 522/100

[58] Field of Search ..... 522/100, 49, 6, 522/7, 25, 27, 31, 53; 525/314

[56] References Cited

U.S. PATENT DOCUMENTS

| | | | |
|---|---|---|---|
| 4,237,245 | 12/1980 | Halasa et al. . | |
| 4,816,496 | 3/1989 | Wada et al. | 522/100 |
| 5,149,895 | 9/1992 | Coolbaugh et al. . | |
| 5,210,359 | 5/1993 | Coolbaugh et al. . | |
| 5,229,464 | 7/1993 | Erickson et al. . | |
| 5,247,026 | 9/1993 | Erickson et al. | 525/314 |

FOREIGN PATENT DOCUMENTS

| | | |
|---|---|---|
| 0396780 A1 | 11/1990 | European Pat. Off. . |
| 0438287 | 7/1991 | European Pat. Off. . |
| 0441485 A2 | 8/1991 | European Pat. Off. . |

OTHER PUBLICATIONS

J. V. Crivello, and J. L. Lee, "Alkoxy–Substituted Diaryliodonium Salt Cationic Photoinitiators," *J. Polymer Science: Part A: Polymer Chemistry*, vol. 27, 3951–3968 (1989).

J. V. Crivello and H. Sasaki, "Synthesis and Photopolymerization of Silicon–Containing Multifunctional Oxetane Monomers," *J.M.S.–Pure Appl. Chem.*, A30(2&3), 173–187 (1993).

*Primary Examiner*—Charles T. Jordan
*Assistant Examiner*—Meena Chelliah

[57] ABSTRACT

In a process of curing epoxidized polymers of conjugated dienes which contain aromatic moieties by exposing the polymers to ultraviolet radiation in the presence of a photoinitiator, the improvement which comprises reducing the amount of irradiation necessary to achieve an effective cure by adding a small but effective amount of a photosensitizer which absorbs UV radiation in a wavelength range which is not obscured by the polymer to the polymer prior to or during irradiation.

16 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR RADIATION CURED CONJUGATED DIENE-VINYL AROMATIC HYDROCARBON BLOCK COPOLYMERS

BACKGROUND OF THE INVENTION

This invention relates to radiation cured conjugated diene-vinyl aromatic hydrocarbon block copolymers which are cured at low radiation doses. More particularly, the invention relates to improved crosslinking of such epoxidized polymers.

Curing of adhesives based on conjugated diolefins and vinyl aromatics has increased the range of service properties for such adhesives. Radiation curing of polymers to make such adhesives is known. Curing of coatings and sealants based on these polymers has reduced solvent content required for such products. This curing causes covalent crosslinking of the polymerized conjugated diolefins which is evidenced by a high gel content of the crosslinked polymer. Before crosslinking, the polymers are melt and solution processable but after crosslinking, the gel cannot be processed as melts or in solution. Crosslinking therefore enhances solvent resistance and improves elevated temperature shear properties, toughness and cohesion. Compositions can therefore be applied to a substrate in a melt or from solution and then crosslinked to form a superior adhesive, coating or sealant. However, improvements in the adhesives, coatings and sealants could be made if the adhesives could be cured at lower dosages of radiation.

Epoxidized block copolymers of conjugated diolefins and vinyl aromatic hydrocarbons have been disclosed as being useful in radiation cured adhesive, coating and sealant compositions (see U.S. Pat. No. 5,229,464). Such polymers were said to be curable using electron beam and ultraviolet radiation. It has been found that epoxidized polymers of conjugated dienes which also contain aromatic moieties require much more irradiation when ultraviolet radiation is used to cure the polymers than such polymers which do not contain aromatic moieties. Such aromatic moieties may be provided by a vinyl aromatic hydrocarbon monomer which is copolymerized with the conjugated diene or they may be provided when an aromatic coupling agent such as divinyl benzene is used to couple polymer arms together.

Radiation curing of such polymers is not an inexpensive process. Increasing the amount of irradiation necessary to cure a polymer increases the overall cost of producing the product. Therefore, it would be advantageous to provide a method wherein epoxidized diene polymers which contain aromatic moieties could be cured to the same extent with approximately the same amount of irradiation as is necessary to cure epoxidized diene polymers which do not contain aromatic moieties. The present invention provides such a process.

SUMMARY OF THE INVENTION

This invention is an improvement upon the process for curing epoxidized polymers of conjugated dienes by exposing the polymers or a formulation containing such polymers to ultraviolet radiation in the presence of a photoinitiator. The epoxidized polymers of the present invention contain aromatic moieties which may be present as a result of copolymerization of a vinyl aromatic hydrocarbon monomer or as a result of the use of an aromatic coupling agent such as divinyl benzene. The present invention is also used when an epoxidized diene polymer which does not contain aromatic moieties is formulated with an aromatic additive such as an aromatic antioxidant or an aromatic resin. The improvement comprises reducing the amount of irradiation necessary to achieve an effective cure by adding a small but effective amount of a photosensitizer, which absorbs UV radiation in a wavelength range which is not obscured by the polymer or aromatic additives, to the polymer prior to or during irradiation. It is preferred that the amount of the photosensitizer range from 0.05 to 0.5 parts per hundred polymer. The preferred type of photosensitizer is thioxanthene and halogen and alkyl derivatives thereof.

DETAILED DESCRIPTION OF THE INVENTION

Polymers containing ethylenic unsaturation can be prepared by copolymerizing one or more olefins, particularly diolefins, by themselves or with one or more alkenyl aromatic hydrocarbon monomers. The copolymers may, of course, be random, tapered, block or a combination of these, as well as linear, star or radial.

The polymers containing ethylenic unsaturation or both aromatic and ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like, but it also may be recovered as a liquid such as in the present invention. Polymers containing ethylenic unsaturation and polymers containing both aromatic and ethylenic unsaturation are available commercially from several suppliers.

In general, when solution anionic techniques are used, copolymers of conjugated diolefins and alkenyl aromatic hydrocarbons are prepared by contacting the monomer or monomers to be polymerized simultaneously or sequentially with an anionic polymerization initiator such as group IA metals, their alkyls, amides, silanolates, napthalides, biphenyls or anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

These polymers are epoxidized and, whether they are hydrogenated or not, it is preferred that the epoxidation take place only to the extent that about 0.1 to about 3 milliequivalents of epoxide per gram of polymer (0.1 to 3 Meq epoxide/g) are generated. Hence, the preferred epoxidized polymer has an epoxide equivalent weight of between about 10,000 and about 333. The polymers may then be crosslinked through at least some of the epoxy functionality, preferably, by radiation.

Preferred block copolymers which are useful in the present invention have the formula $$(A—B—A_p)_n—Y_r—(A_q—B)_m$$

wherein Y is a coupling agent or coupling monomers, and wherein A and B are polymer blocks which may be homopolymer blocks of conjugated diolefin monomers, copolymer blocks of conjugated diolefin monomers or copolymer blocks of diolefin monomers and monoalkenyl aromatic hydrocarbon monomers. An aromatic moiety, whether in the form of a comonomer or coupling agent, must be present in the polymer (or an aromatic additive must be in the polymer formulation). These polymers are described in more detail in allowed U.S. Pat. No. 5,229,464, which is herein incorporated by reference. Generally, the A blocks should have a greater concentration of more highly substituted aliphatic double bonds than the B blocks have. The A blocks will have a greater concentration of di-, tri-, or tetra-substituted aliphatic double bonds. For example, in one embodiment, the A blocks will have a greater number of tertiary unsaturation (TU) sites per unit of block mass than the B blocks, where a TU site is defined to be an olefinic double bond (ODB) between a tertiary carbon atom and either a primary or secondary carbon atom. The A blocks have a molecular weight of from about 100 to about 3,000 and the B blocks have a molecular weight of from about 1000 to about 15,000. n is greater than 0, r is 0 or 1, m is greater than or equal to 0, and n+m ranges from 1 to 100. p and q may be 0 or 1. When either p or q or both are 1, extra TU sites are available in the interior of the polymer chain. By way of example, polymer block A could be polyisoprene having about 14.7 milliequivalents of residual ODB's per gram, all of which would be TU sites (14.7 Meq TU/g), and polymer block B could be polybutadiene having 18.5 milliequivalents of residual ODB's per gram, none of which would be TU sites (0 Meq TU/g).

The present invention also encompasses polymers which have midblocks formed of monoalkenyl aromatic hydrocarbon monomers, preferably styrene. In this situation, the A blocks would be conjugated dienes containing di-, tri- and/or tetra-substituted aliphatic double bonds and the B blocks would be formed of the monoalkenyl aromatic hydrocarbon. This type of polymer is not a rubbery polymer, but rather is hard and rigid. This type of polymer can be cured in situ to give a material with reinforcing crosslinks.

The polymers described immediately above are relatively low molecular weight low viscosity materials. Higher molecular weight higher viscosity epoxidized polymers containing aromatic moieties may also be used to advantage according to the present invention. Indeed, the epoxidized diene block copolymers of the present invention may have molecular weights of from about 3000 to about 3,000,000. Lower molecular weight materials require excessive crosslinking whereas higher molecular weight materials are very difficult to apply to a substrate by melt or other means. Blocks comprising predominantly conjugated diolefin monomer units generally will have molecular weights between about 300 and about 200,000 prior to epoxidation and, if present, blocks comprising predominantly aromatic monomer units will have molecular weights between about 500 and about 50,000 because polymers built from larger blocks are very difficult to apply and smaller blocks fail to adequately localize covalent or physical crosslinking.

Useful randomly epoxidized star polymers containing aromatic moieties are described in allowed copending application Ser. No. 901,349, filed Jun. 19, 1992, entitled "Randomly Epoxidized Small Star Polymers," which is herein incorporated by reference. That application describes randomly epoxidized star polymers, based on at least one conjugated diolefin monomer, that contained di-, tri- and/or tetrasubstituted olefinic epoxides. The star polymers have greater than four arms or branches. Each arm has a molecular weight from 1500 to 15,000 and the concentration of di-, tri-, or tetrasubstituted olefinic epoxides (1,1-disubstituted, 1,2-disubstituted, 1,1,2-trisubstituted and 1,1,2,2-tetrasubstituted olefinic epoxides) is from 0.05 to 5 milliequivalents of epoxide per gram of polymer. In this invention, we prefer 0.1 to 3 Meq/g.

Other useful block copolymers containing aromatic moieties are based on at least one conjugated diolefin monomer, contain a greater concentration of di-, or tri-, or tetrasubstituted olefinic epoxides in the exterior blocks, and lesser concentrations of these epoxides in the interior blocks of the polymer. The exterior blocks generally contain such epoxides within the concentration range of 0.2 to 10 milliequivalents of exterior block and the ratio of the concentration such epoxide groups in the exterior blocks to the concentration in the interior blocks is at least 3:1. The molecular weight of the exterior blocks ranges from 3000 to 50,000 and the molecular weight of the interior blocks ranges from 15,000 to 200,000. Such polymers are described in more detail in copending application Ser. No. 863,579, filed Apr. 3, 1992, entitled "Epoxidized Diene Elastomers for Exterior Block Crosslinking," which is herein incorporated by reference. A special case is where the exterior blocks are formed of polyisoprene polymerized under conditions that yield primarily 1,4-polyisoprene (trisubstituted) and the interior blocks are of polybutadiene (mono- or disubstituted). Another special case is where the exterior block is a random polystyrene-polyisoprene copolymer in which a majority of the polyisoprene is 1,4-polyisoprene and the interior block is polybutadiene. Such polymers give the advantage of localizing the crosslinking in the exterior blocks.

In general, any of the solvents known in the prior art to be useful in the preparation of such polymers may be used. Suitable solvents, then, include straight and branched chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as alkyl-substituted derivatives thereof; aromatic and alkyl-substituted derivatives thereof; aromatic and alkyl-substituted aromatic hydrocarbons such as benzene, napthalene, toluene, xylene and the like; hydrogenated aromatic hydrocarbons such as tetralin, decalin and the like; linear and cyclic ethers such as methyl ether, methylethyl ether, diethyl ether, tetrahydrofuran and the like.

More specifically, the polymers of the present invention are made by the anionic polymerization of conjugated diene monomers and alkenyl aromatic hydrocarbon monomers in a hydrocarbon solvent at a temperature between 0° and 100° C. using an alkyl lithium initiator. The living polymer chains are usually coupled by addition of divinyl monomer to form a star polymer. Additional monomers may or may not be added to grow more branches or to terminally functionalize the polymer and the living chain ends are quenched with a proton source.

Diblock molecular weights are conveniently measured by Gel Permeation Chromatography (GPC), where the GPC system has been appropriately calibrated. Polymers of known molecular weight are used to calibrate and these must be of the same molecular structure and chemical composition as the unknown diblock polymers that are measured. For anionically polymerized diblock polymers, diblock polymer is essentially monodisperse and it is both convenient and adequately descriptive to report the "peak" molecular weight of the narrow molecular weight distribution observed. Measurement of the true molecular weight of the final coupled star polymer is not as straightforward or as easy to make using GPC. This is because the star shaped molecules do not separate and elute through the packed GPC columns in the same manner as do the linear polymers used for the calibration, and, hence, the time of arrival at a UV or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wave length and in the same solvent used for the light scattering. The following references are herein incorporated by reference:

1. *Modern Size-Exclusion Liquid Chromatography*, W. W. Yau, J. J. Kirkland, D. D. Bly, John Wiley & Sons, New York, N.Y., 1979.
2. *Light Scattering from Polymer Solution*, M. B. Huglin, ed., Academic Press, New York, N.Y., 1972.
3. W. Kaye and A. J. Havlik, *Applied Optics,* 12, 541 (1973).
4. M. L. McConnell, *American Laboratory,* 63, May, 1978.

There are a wide variety of coupling agents that can be employed. Any polyfunctional coupling agent which contains at least two reactive sites can be employed. Examples of the types of compounds which can be used include the polyepoxides, polyisocyanates, polyimines, polyaldehydes, polyketones, polyanhydrides, polyesters, polyhalides, and the like. These compounds can contain two or more types of functional groups such as the combination of epoxy and aldehyde groups, isocyanate and halide groups, and the like. Many suitable types of these polyfunctional compounds have been described in U.S. Pat. Nos. 3,595,941; 3,468,972, 3,135,716; 3,078,254; 4,096,203 and 3,594,452 which are herein incorporated by reference. When the coupling agent has two reactive sites such as dibromoethane, the polymer will have a linear ABA structure. When the coupling agent has three or more reactive sites, such as silicon tetrachloride, the polymer will have a branched structure, such as $(AB)_nY$. Coupling monomers are coupling agents where several monomer units are necessary for every chain end to be coupled. Divinylbenzene is the most commonly used coupling monomer and results in star polymers.

If a substantially saturated polymer is desired, the epoxidized polymer is hydrogenated to remove substantially all remaining olefinic double bonds (ODB) and normally leaving substantially all of the aromatic double bonds. If only substantially saturated interior blocks are desired, the epoxidized polymer may be partially hydrogenated in a selective manner with a suitable catalyst and conditions (like those in Re 27,145, U.S. Pat. No. 4,001,199 or with a titanium catalyst such as is disclosed in U.S. Pat. No. 5,039,755, all of which are incorporated by reference; or by fixed bed hydrogenation) that favor the hydrogenation of the less substituted olefinic double bonds (rate or hydrogenation: monosubstituted >disubstituted >trisubstituted >tetrasubstituted olefinic double bonds) and also leaves aromatic double bonds intact, so as to saturate the B blocks and leave some or all of the unsaturation intact in the A blocks and/or any portions of the optional M block or the C arms that may also contain unepoxidized higher substituted olefinic double bonds.

Alternatively, selective partial hydrogenation of the polymer may be carried out before epoxidation such that between 0.2 and 11.6 Meq of olefinic double bonds are left intact, as required of an A block for subsequent epoxidation. Fully epoxidizing 11.6 Meq of ODB per gram of polymer gives 10.0 Meq of epoxide per gram of the final polymer because of a 16% weight gain due to the added oxygen. If selective partial hydrogenation is done first, the epoxidation does not need to be selective with respect to the degree of substitution on the olefinic double bonds, since the objective is usually to epoxidize as many of the remaining ODB's as possible. After hydrogenation, it is preferred that the ratio of ODB's in the A blocks to that in the B blocks be at least 3:1.

Generally, if a hydrogenation step is used, sufficient improvement of the polymer's chemical and heat stability should be achieved to justify the extra expense and effort involved, and this generally means at least saturating the interior blocks B to the point that they have less than 1 Meq of olefinic double bonds per gram of B left intact. For greatest heat stability, all of the olefinic double bonds, anyplace in the polymer, that are not epoxidized should be removed so that less than 1 Meq of ODB per gram of polymer remain, more preferably less than 0.6 Meq/g, and most preferably less than about 0.3 Meq/g of polymer.

The epoxidized copolymers of this invention can be prepared by the epoxidation procedures as generally described or reviewed in the *Encyclopedia of Chemical Technology* 19, 3rd ed., 251–266 (1980), D. N. Schulz, S. R. Turner, and M. A. Golub, *Rubber Chemistry and Technology,* 5, 809 (1982), W-K. Huang, G-H. Hsuie, and W-H. Hou, *Journal of Polymer Science, Part A: Polymer Chemistry,* 26, 1867 (1988), and K. A. Jorgensen, *Chemical Reviews,* 89, 431 (1989), and Hermann, Fischer, and Marz, Angew. *Chem. Int. Ed. Engl.* 30 (No. 12), 1638 (1991), all of which are incorporated by reference.

Epoxidation of the base polymer can be effected by generally known methods such as by reaction with organic peracids which can be performed or formed in situ. Suitable preformed peracids include peracetic and perbenzoic acids. In situ formation may be accomplished by using hydrogen peroxide and a low molecular weight fatty acid such as formic acid. Alternatively, hydrogen peroxide in the presence of acetic acid or acetic anhydride and a cationic exchange resin will form a peracid. The cationic exchange resin can optionally be replaced by a strong acid such as sulfuric acid or p-toluenesulfonic acid. The epoxidation reaction can be conducted directly in the polymerization cement (polymer solution in which the polymer was polymerized) or, alternatively, the polymer can be redissolved in an inert solvent such as toluene, benzene, hexane, cyclohexane, methylenechloride and the like and epoxidation conducted in this new solution or can be epoxidized neat. Epoxidation temperatures on the order of about 0 to 130° C. and reaction times from about 0.1 to 72 hours may be utilized. When employing hydrogen peroxide and acetic acid together with a catalyst such as sulfuric acid, the product can be a mixture of epoxide and hydroxy ester. The use of peroxide and formic acid in the presence of a strong acid may result in diolefin polymer blocks containing both epoxide and hydroxy ester groups. Due to these side reactions caused by the presence of an acid, it is preferable to carry out the epoxidation at the lowest possible temperature and for the shortest time consistent with the desired degree of epoxidation.

Epoxidation may also be accomplished by treatment of the polymer with hydroperoxides in the presence of transition metals such as Mo, W, Cr, V and Ag. Epoxy functionality may also be created by direct oxidation of ethylenic unsaturation by $0_2$ in the presence of tetra cyanoethylene. A temperature of about 150° C. and an oxygen partial pressure of about 58 atmospheres is suitable for this reaction.

The epoxidized polymers may then be formulated for their specific applications. The present invention embodies the use of photoinitiator/ photosensitizer systems with aromatic formulation ingredients. Resins and antioxidants are such formulating ingredients.

Examples of aromatic resins useful in the formulation of epoxidized diene polymers are AMOCO® 18 series resins, which are composed of alpha methyl styrene (AMOCO), Kristalexe series resins, which are composed of alpha methyl styrene (HERCULES), PICCOTEX® Series resins, which are composed of alpha methyl styrene and vinyl toluene (HERCULES), NEVCHEM® (NEVILLE) and PICCO 6000 (HERCULES) series resins, which are composed of aromatic hydrocarbons, CUMAR® series resins and CUMAR LX-509 (NEVILLE), which are composed of coumarone-indene, PICCOVAR® AP series resins (HERCULES), which are composed of alkyl aryl species, PICCOVAR® 130 (HERCULES), which is an alkyl aromatic poly indene resin, and PICCOFYN® A100 (HERCULES), which is a terpene phenolic resin.

Examples of aromatic antioxidants useful in the formulation of epoxidized diene polymers are ULTRANOX® 626 (GE Chemicals), bis(2,4-di-t-butylphenyl) pentaerythritol diphosphite, ANTIOXIDANT 330® (ETHYL CORP.), 1,3,5-trimethyl-2,4,6-tris(3,5-di-t-butyl-4-hydroxybenzyl) benzene, IRGANOX 565® (Ciba Geigy), 2,4-bis(n-octylthio)-6-(4-hydroxy-3,5-di-t-butylanilino)-1,3,5-triazine, IRGANOX 1010® (Ciba Geigy), 2,2-bis[[3-[3,5-bis-(1,1-dimethylethyl)-4-hydroxyphenyl]-1-oxopropoxy] methyl]-1,3-propanediyl-3,5- bis(1,1-dimethyl ethyl)-4-hydroxybenzeneproprionate, IRGANOX 1076® (Ciba Geigy), octadecyl-3-(3',5'-di-t-butyl-4'-hydroxyphenyl) proprionate, POLYGARD HR® (UNIROYAL CHEM.), tri-nonyl-phenyl-phoshite, and butylated hydroxytoluene.

Formulation ingredients of the present invention are not limited to aromatic compounds solely but are comprised of all compounds which absorb UV radiation in the range of 200 to 350 nm.

The process of the present invention involves the use of ultraviolet light to cure the polymers described above which contain aromatic moieties. Ultraviolet light sources may be based on the mercury-vapor arc. Mercury is enclosed in a quartz tube and a potential is applied to electrodes at either end of the tube. The electrodes can be of mercury, iron, tungsten or other metals. The pressure in the mercury-vapor lamp may be less than 1 atm to more than 10 atm. As the mercury pressure and lamp operating temperatures are increased, the radiation becomes more intense and the width of the emission lines increases. Other UV light sources include electrodeless lamps, Xenon lamps, pulsed Xenon lamps, Argon ion lasers and Excimer lasers.

The mechanism of the radiation crosslinking is believed to be generation of cations by removal of an electron from the polymer chain. The cation then readily reacts with an epoxy group, if an epoxy group is available. This reaction results in an ether crosslink between two polymer molecules and a new cation site on a polymer which formerly contained the epoxy functionality. The new cation will either propagate, forming another ether crosslink with another epoxy oxygen, or terminate by recapturing an electron.

The presence of water in the polymer composition during the radiation crosslinking is very undesirable due to the tendency of water to terminate the crosslinking. The radiation curing is therefore generally more effective if the polymeric composition is at a temperature near or above the boiling point of water at the time of the radiation curing.

The amount of radiation necessary for high gel formation varies with the thickness of the polymeric mass being irradiated, the amount of epoxy functionality, the extent to which the epoxy functionality is concentrated in specific regions within the polymeric mass and the type of radiation utilized.

When using non-ionizing radiation it is necessary to employ a photoinitiator to initiate the crosslinking reaction. Useful photoinitiators include diaryliodonium, alkoxy-substituted diaryliodonium, alkyl substituted diaryliodonium, triarylsulfonium, dialkylphenacylsulfonium, and dialkyl-4-hydrophenylsulfonium salts. The anions in these salts generally possess low nucleophilic character and include $SbF_6$-, $BF_4$-, $PF_6$- and $AsF_6$-. Specific examples include (4-octyloxyphenyl)-phenyl-iodium hexafluoroantimonate, UVI-6990 (from Union Carbide), FX-512 (3M Company), UVI-6974, an aryl sulfonium salt (Union Carbide), and UV9310C, alkyl-substituted aryl iodonium salt.

As has been discussed above, we have found that epoxidized polymers and epoxidized polymer formulations containing aromatic additives containing aromatic moieties do not cure as well using ultraviolet radiation with a photoinitiator as epoxidized polymers and epoxidized polymer formulations which do not contain aromatic moieities. We have also found that we can decrease the amount of irradiation necessary to cure epoxidized polymers and epoxidized polymer formulations containing aromatic moieties dramatically by the addition of a photosensitizer to the polymer prior to or during the irradiation treatment.

The amount of photosensitizer necessary is very small. The only requirement is that it be great enough to be effective in absorbing ultraviolet light in a wave length region which is not obscured by the aromatic moieties in the polymer or the formulation. It is theorized that the aromatic moieties present in these polymers or formulations absorb the ultraviolet light and prevent the radiation from activating the photoactive photoinitiator compound. The presence of the photosensitizer which is activated by ultraviolet light of a different wave length provides a species which absorbs this ultraviolet radiation and then is required to transfer its absorbed energy to the photoinitiator which then goes on to generate a cation to initiate crosslinking of the epoxy groups. This is the function of the photosensitizer. The preferred photosensitizer absorbs UV radiation in the range of 300 to 450 nm. It is preferred that the photosensitizer be used in an amount from 0.05 to 0.5 parts per hundred polymer because at the lower limit its effectiveness is minimized and at the upper limit the effectiveness is maximized and higher levels become economically impractical. If the polymer, with or without aromatic moieties, is incorporated into a formulation with additives which absorb UV radiation in the range of 200 to 350 nm, the photosensitizer should be used in an amount of 0.05 to 0.5 weight percent of the formulation.

It is important that the photoinitiator/photosensitizer/polymer system be suitably matched. The photoinitiator must be able to accept energy in the range emitted by the photosensitizer and both must be suitably compatible with the polymer matrix. For instance, while perylene is well known as a photosensitizer we have found it to be ineffective for enhancing crosslinking of epoxidized diene polymers when matched with CYRACURE UVI-6974 (Union Carbide). Generally, the effective photoinitiator/photosensitizer/polymer system is chosen through experimentation.

Examples of photosensitizers include thioxanthone and its halo-and alkyl-derivatives, anthracene, perylene, phenothiazione, 1,2-benzathracene, coronene, pyrene, benzophenone, phenothiazine, acetophenone and tetracene. Thioxanthone and its derivaties are preferred. The most preferred photosensitizer is 2-chlorothioxanthen-9-one because it is effective in sensitizing commercially available alkyl-aryl-iodonium salts and these salts have been found to be advantageously compatible with epoxidized diene polymers. The photoinitiator and photosensitizer are chosen to be compatible with the polymer being crosslinked and the light source available.

Reactive (radiation curable) diluents that can be added to the polymer include alcohols, vinyl ethers, epoxides, acrylate and methacrylate monomers, oligomers and polymers. They may also be blended with other diene-based polymers. Examples of epoxides include bis(2,3-epoxy cyclopentyl) ether, vinyl cyclohexene dioxide, limonene dioxide, vernonia oil, epoxidized soya and linseed oils and fatty acids.

The crosslinked materials of the present invention are useful in adhesives (including pressure sensitive adhesives, contact adhesives, laminating adhesives and assembly adhesives), sealants, coatings, films (such as those requiring heat and solvent resistance), etc. However, it may be necessary for a formulator to combine a variety of ingredients together with the polymers of the present invention in order to obtain products having the proper combination of properties (such as adhesion, cohesion, durability, low cost, etc.) for particular applications. Thus, a suitable formulation might contain only the polymers of the present invention and the curing agent. However, in most adhesive coating and sealant applications, suitable formulations would also contain various combinations of resins, plasticizers, fillers, solvents, stabilizers and other ingredients such as asphalt. The following are some typical examples of the UV curing of neat polymers which, by themselves, may be useful for adhesives, coatings and sealants.

EXAMPLE 204 is a linear isoprene-styrene/butadiene-isoprene molecule containing 38.7% styrene. It has been partially hydrogenated and then epoxidized. 205 is an isoprene-butadiene star polymer which has been coupled with divinylbenzene (DVB). It also has been partially hydrogenated and then epoxidized. 103 is a radial isoprene-butadiene polymer which has been coupled using silicon tetrachloride. It has been epoxidized.

Aromatic units have been incorporated into both 204 and 205. 103 does not have any aromatic units incorporated into its chain structure. 204 strongly absorbs UV light in the range of 200–300 nm. This UV absorption is attributed to the presence of styrene-monomer units in the polymer chain structure. 205 also absorbs in the same wavelength range. However, the absorption is considerably weaker. The absorption in this polymer is attributed to the presence of DVB in the star core. The level of DVB amounts to 6 wt % of the total polymer. Thus, the amount of aromatic monomer is less in 205 than in 204. The absorption spectrum of 103 shows that this polymer absorbs essentially no UV radiation in the range of 250–300 nm.

UV-9310C is an alkyl substituted aryl iodonium hexafluoroantimonate from GE Chemicals. It was used to crosslink these polymers. The initiator absorbs in the range 200–300 nm. Thus, 204 and 205 will act to filter some portion of the radiation necessary to activate the photoinitiators.

Experiments were undertaken to study the effect of a photosensitizer on the UV crosslinking of these polymers. In general, photosensitizers absorb UV radiation in a spectral region free of other absorptions and then transfer the absorbed energy to the photoinitiator to start crosslinking. One photosensitizer, 2-chloro-thioxanthen-9-one (CTX), was used in combination with iodonium salt initiators. The mechanism of the photosensitization is thought to be excitation of the sensitizer and subsequent electron transfer to the iodonium salt photoinitiator. The photoinitiator then decomposes to generate a cation which begins the crosslinking reaction. CTX absorbs strongly in the region 350–450 nm. This region is free of absorptions of both the polymers and the photoinitiator used which was 0.5 parts per hundred polymer UV-9310C photoinitiator. 0.0 or 0.1 parts CTX photosensitizer were used. The formulations were made in THF.

Films 1 mil thick were cast on poly(ethylene terephthalate) film. After air drying in the dark and a 2 minute bake at 120° C. the films were irradiated using a Linde Photocure System PS-2000-1HD. A prefocused, full spectrum bulb provided 800 Watts/ft in the spectral range 185–400 nm. The irradiation was carried out at both 30 and 90 feet per minute. The films were then baked for 10 minutes at 120° C. The gel fraction of the irradiated polymers was then measured using a standard technique. The results are listed in Tables I and II.

TABLE I

UV Initiated Cure
Effect of Photosensitizer
(2-chlorothioxanthen-9-one, CTX)

| Polymer | Photosensitizer Level (phr) | Gel Fraction |
|---|---|---|
| 103 | 0.0 | 0.97 |
| 103 | 0.1 | 0.98 |
| 204 | 0.0 | 0.55 |
| 204 | 0.1 | 0.44 |
| 205 | 0.0 | 0.67 |
| 205 | 0.1 | 0.75 |

photoinitiator: UV9310C, aryl iodonium hexafluoroantiomonate, 0.5 phr
source: medium pressure UV bulb
line speed: 30 feet per minute

TABLE II

UN Initiated Cure
Effect of Photosensitizer
(2-chlorothioxanthen-9-one, CTX)

| Polymer | Photosensitizer Level (phr) | Gel Fraction |
|---|---|---|
| 103 | 0.0 | 0.81 |
| 103 | 0.1 | 0.76 |
| 204 | 0.0 | 0.09 |
| 204 | 0.1 | 0.63 |
| 205 | 0.0 | 0.11 |
| 205 | 0.1 | 0.50 |

photoinitiator: UV9310C, aryl iodonium hexafluoroantimonate, 0.5 phr
source: medium pressure UV bulb
line speed: 90 feet per minute The experiment carried out at the slower speed, 30 feet per minute, provided more irradiation to the polymers. It can be seen that the gel fractions of the samples containing styrene either decreased or did not increase very much at this higher level of irradiation.

However, the results were quite different at the faster line speed which provided much less irradiation. When no photosensitizer is present only 103 is crosslinked to a significant degree. Upon incorporation of 0.1 phr CTX the gel fraction of 204 is improved from 0.09 to 0.63. Likewise, the gel fraction of 205 is improved from 0.09 to 0.50. The gel fraction of 103 is essentially unchanged by incorporation of the photosensitizer. At this low level of irradiation, the limiting gel fraction of 204 and 205 is approached when the photosensitizer is present. When it is not present, only impratically low levels of gel are produced. These results show that the photosensitizer in conjunction with the photoinitiator significantly enhanced the cure rate of epoxidized polymers which contain UV absorbing aromatic segments.

We claim:

1. In a process of curing epoxidated polymers of conjugated dienes which contain aromatic moieties by exposing the polymers or a formulation containing such polymers to ultraviolet radiation in the presence of a photoinitiator, the improvement which comprises reducing the amount of irradiation necessary to achieve an effective cure by adding from 0.05 to 0.5 parts per hundred polymer of a photosensitizer which absorbs UV radiation in a wavelength range which is not obscured by the polymer to the polymer prior to or during irradiation.

2. The process of claim 1 wherein the photosensitizer absorbs UV radiation in the range of 300 to 450 nm.

3. The process of claim 2 wherein the photosensitizer is selected from the group consisting of thioxanthone and its alkyl- and halo-derivatives.

4. The process of claim 2 wherein the photoinitiator is an aryl iodonium salt.

5. The process of claim 2 wherein the photoinitiator is an aryl sulfonium salt.

6. The process of claim 2 wherein the photoinitiator is an alkyl-aryl iodonium salt.

7. The process of claim 2 wherein the photosensitizer is perylene, thioxanthone, alkyl-thioxanthones, and halo-thioxanthones.

8. The process of claim 1 wherein the polymer contains monovinyl aromatic monomers.

9. The process of claim 1 wherein the polymer is an epoxidized star polymer containing aromatic coupling agents.

10. In a process of curing a formulation containing at least one epoxidized polymer of a conjugated diene and at least one additive which absorbs UV radiation in the range of 200 to 350 nm, the improvement which comprises reducing the amount of irradiation necessary to achieve and effective cure by adding from 0.05 to 0.5 weight percent of the informulation of a photosensitizer which absorbs UV radiation in a wavelength.

11. The process of claim 10 wherein the photosensitizer absorbs UV radiation in the range of 300 to 450 nm.

12. The process of claim 11 wherein the photosensitizer is selected from the group consisting of thioxanthone and its alkyl- and halo-derivatives.

13. The process of claim 11 wherein the photoinitiator is an aryl iodonium salt.

14. The process of claim 11 wherein the photoinitiator is an aryl sulfonium salt.

15. The process of claim 11 wherein the photoinitiator is an alkyl-aryl iodonium salt.

16. The process of claim 11 wherein the photosensitizer is perylene, thioxanthone, alkyl-thioxanthones, and halo-thioxanthones.

* * * * *